United States Patent
Katsuta

(10) Patent No.: US 8,744,136 B2
(45) Date of Patent: Jun. 3, 2014

(54) SOUND REPRODUCTION METHOD AND DEVICE

(75) Inventor: Masanori Katsuta, Hamamatsu (JP)

(73) Assignee: Kabushi Kaisha Kawai Gakki Seisakusho, Hamamatsu-shi (JP)

( * ) Notice: Subject to any disclaimer, the term of this patent is extended or adjusted under 35 U.S.C. 154(b) by 118 days.

(21) Appl. No.: 13/433,228

(22) Filed: Mar. 28, 2012

(65) Prior Publication Data

US 2012/0250941 A1  Oct. 4, 2012

(30) Foreign Application Priority Data

Mar. 31, 2011  (JP) ................................. 2011-079293

(51) Int. Cl.
*G06K 9/00* (2006.01)
*A63H 5/00* (2006.01)

(52) U.S. Cl.
USPC .............................. 382/113; 382/100; 84/609

(58) Field of Classification Search
CPC .............. G06K 9/18; G10H 2220/441; G10H 2220/451; G10H 2220/455
USPC ............. 382/113, 181, 190–208; 84/600–603
See application file for complete search history.

(56) References Cited

U.S. PATENT DOCUMENTS

| 5,883,970 | A * | 3/1999 | Kikuchi | 382/113 |
| 6,580,805 | B1 * | 6/2003 | Nakano | 382/100 |
| 2006/0062462 | A1 * | 3/2006 | Li et al. | 382/186 |
| 2007/0172113 | A1 * | 7/2007 | Sai et al. | 382/159 |
| 2009/0202106 | A1 * | 8/2009 | Hong et al. | 382/100 |
| 2010/0212478 | A1 * | 8/2010 | Taub et al. | 84/645 |

FOREIGN PATENT DOCUMENTS

| JP | 2979409 | 9/1999 |
| JP | 2003-242438 | 8/2003 |

OTHER PUBLICATIONS

McKay, "Horizonal Line Detection Software," retrieved from: http://www.music.mcgill.ca/~cmckay/software/musictech/ScoreReader/HorizontalLineDetection.html, earliest archived online publication date is Dec. 27, 2005.*

* cited by examiner

*Primary Examiner* — Vu Le
*Assistant Examiner* — Soo Park
(74) *Attorney, Agent, or Firm* — Christie, Parker & Hale, LLP

(57) ABSTRACT

A sound reproduction program is provided which, in performing reading and sound reproduction of a musical score, precision of musical score recognition is improved. The sound reproduction program is stored in a terminal including the image pickup unit and a display unit and makes a computer execute a function of reading a musical score image at every predetermined time as a sampling image by a camera device, a function of detecting a staff in a simple manner from the sampling image, a function of displaying the sampling image and the simply detected staff in an associated manner on the display unit, a function of instructing detection of musical symbol information from the sampling image, a function of detecting the musical symbol information from the sampling image when the musical symbol information detection is instructed, and a function of emitting a sound based on the detected musical symbol information.

9 Claims, 3 Drawing Sheets

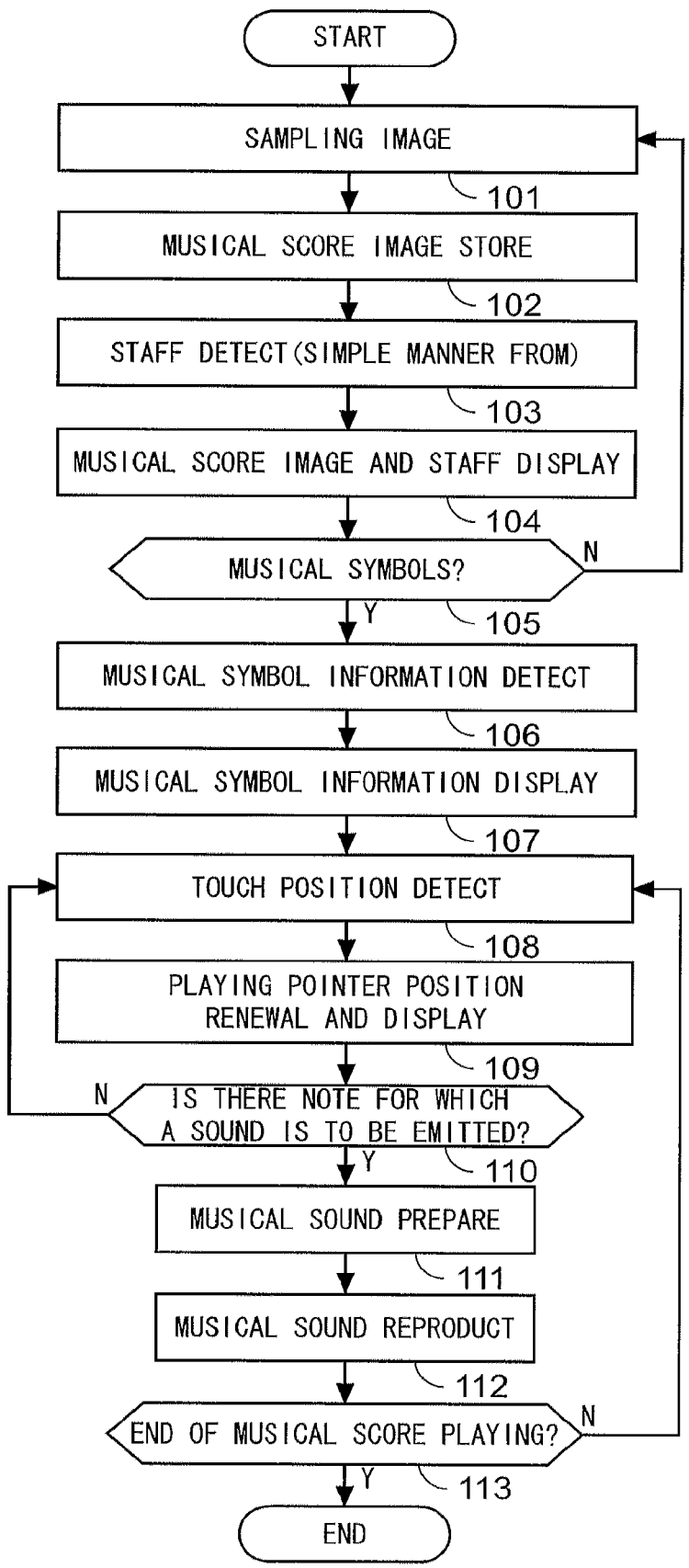

SOUND REPRODUCTION METHOD AND DEVICE

CROSS-REFERENCE TO RELATED APPLICATION

This application claims priority to and the benefit of Japanese Patent Application No. 2011-079293, filed in the Japanese Patent Office on Mar. 31, 2011, the entire contents of which are incorporated herein by reference.

TECHNICAL FIELD

The present invention relates to a musical score recognition art of detecting musical information upon reading a musical score image imaged by a camera or other image pickup unit and particularly relates to a sound reproduction program and a sound reproduction device that reproduce musical sounds from the read musical information.

BACKGROUND

A musical score recognition device that reads a printed musical score as a musical score image by an image scanner has been proposed since priorly. For example, as disclosed in Patent Literature 1, the musical score recognition device reads the musical score image and detects staffs, notes, symbols related to pitches of notes, etc., from the read musical score image to recognize musical information necessary for playing.

With a printed musical score, it is difficult for a general person without any special musical training to imagine melodies and pitches by looking at the musical score.

Meanwhile, with the recent popularity of camera-equipped mobile terminals, presence of a tool that enables a musical score to be imaged easily and enables the musical score to be played or melodies and musical intervals to be checked immediately on the spot has been desired.

SUMMARY OF INVENTION

However, in a case of a musical score image imaged by a low definition camera installed in a mobile terminal, nonuniformity of color and contrast, fuzziness, distortion, blur, etc., occur due to various imaging conditions, such as type and brightness of light source of the imaging environment, camera performance, imaging settings, curvature and contrast of the score, imaging distance and angle, etc., and thus in comparison to a musical score image of high definition obtained by reading a printed musical score by a scanner, detection precision of musical information, including staffs and notes, cannot be anticipated and there is thus an issue that unless the imaging conditions are particularly good, accurate reproduction of melodies and musical intervals of a musical score image is difficult.

The present invention has been made in view of the above circumstances and an object thereof is to provide a sound reproduction device and a sound reproduction program capable of reproducing melodies and musical intervals of a score upon reading a musical score image using an image pickup unit that is not required to be high in definition.

In order to achieve the above object, the present invention takes note of the point that by enabling a person taking an image of a musical score to ascertain qualities of imaging conditions in real time during imaging, capturing of only images imaged under satisfactory imaging conditions is enabled.

That is, a first aspect of the present invention provides a sound reproduction program stored in a terminal that includes an image pickup unit and a display unit and making a computer execute a function of reading a musical score image at every predetermined time as a sampling image by the image pickup unit, a function of detecting a staff in a simple manner from the sampling image, a function of displaying the sampling image and the simply detected staff in an associated manner on the display unit, a function of instructing detection of musical symbol information from the sampling image, a function of detecting the musical symbol information from the sampling image when the musical symbol information detection is instructed, and a function of emitting a sound based on the detected musical symbol information.

Although ideally, it is desirable to detect the musical symbol information from the sampling image at every predetermined time, such a process takes time. Thus, the processing time is shortened and a sampling cycle is made as short as possible by simple detection of just the staff.

The second respect of the invention is the sound reproduction program according to the first respect, wherein the simple detection of the staff is performed from a binarized image resulting from automatic binarization of the sampling image across a threshold set in advance and the sampling image and the binarized image are displayed in an associated manner on the display unit.

The third respect of the invention is the sound reproduction program according to the first respect wherein the simply detected staff itself in the sampling image is displayed in a distinguishable manner.

The forth respect of the invention is the sound reproduction program according to the first respect, wherein a simply detected staff region in the sampling image and a region besides the staff region are displayed in a distinguishable manner.

The fifth respect of the invention is the sound reproduction program according to the first respect, wherein, when simple detection of a staff from the sampling image has been performed, detection of musical symbol information is instructed automatically only in a case where a predetermined detection condition is met.

The sixth respect of the invention is a sound reproduction device comprising:

an image pickup means performing image pickup of a musical score image;

a sampling image recording means recording the musical score image at every predetermined time as a sampling image;

a simple staff detecting means performing simple detection of a staff from the sampling image;

a musical symbol detection switch instructing detection of a staff, note, clef, and other musical symbol information from the sampling image from which the staff was simply detected;

a musical symbol detecting means detecting the musical symbol information from the sampling image;

a musical score display means displaying the musical symbol information; and a musical sound reproducing means reproducing a musical sound based on the musical symbol information displayed by the musical score display means.

The seventh respect of the invention is the sound reproduction device according to the sixth respect, wherein the simple staff detecting means includes a means that performs staff detection from a binarized image resulting from binarization of the sampling image and displays the sampling image and the binarized image in an associated manner on the display unit.

The eighth respect of the invention is the sound reproduction device according to the sixth respect, wherein the musical symbol detection switch includes a means, which, when the simple staff detecting means simply detects a staff from the sampling image, automatically instructs the detection of the musical symbol information only if the detected staff meets a predetermined detection condition.

The ninth respect of the invention is the sound reproduction device according to the seventh respect, further comprising a threshold setting means that adjusts and sets a threshold for binarization when the sampling image is binarized.

By the present invention (first aspect and fifth aspect), when a user of the terminal takes an image of a musical score and a staff is simply detected for the sampling image of the musical score image read by the image pickup unit, the sampling image and the detected staff are displayed in an associated manner, thereby enabling qualities of imaging conditions during imaging to be ascertained in real time. By then instructing detection of the musical symbol information from the sampling image from which the staff has been simply detected, musical symbol information can be detected from the sampling image of satisfactory imaging conditions, thereby enabling the musical score image to be read as accurate musical information.

By the second and seventh aspects of the invention, qualities of an imaging environment can be ascertained by a binarized image being displayed in association with the sampling image.

By the third aspect of the invention, the detected staff itself is displayed in a distinguishable manner in the sampling image, thereby enabling the user of the terminal to check that the staff has been simply detected and readily judge that the musical score image is readable as accurate musical information.

By the fourth aspect of the invention, a region of the detected staff and a region besides the staff region are displayed in a distinguishable manner in the sampling image, thereby enabling the user of the terminal to check that the staff has been simply detected and readily judge that the musical score image is readable as accurate musical information.

By the fifth and eighth aspects of the invention, the musical symbol information detection is instructed automatically when the staff has been simply detected from the sampling image, thereby enabling the musical symbol information to be detected from the sampling image without requiring operation by the user.

By the ninth aspect of the invention, by inclusion of a threshold setting means that adjusts and sets a threshold for binarization in the process of simple detection of the staff from the image pickup data (sampling image), sensitivity adjustment of the image pickup means can be performed in accordance with the imaging environment.

BRIEF DESCRIPTION OF DRAWINGS

FIG. 3 is a flowchart of a processing procedure for musical score image reading to musical sound reproduction by the sound reproduction program of the present invention.

DESCRIPTION OF EMBODIMENTS

An example of an embodiment of a sound reproduction device according to the present invention shall now be described with reference to the drawings.

Figure 1:
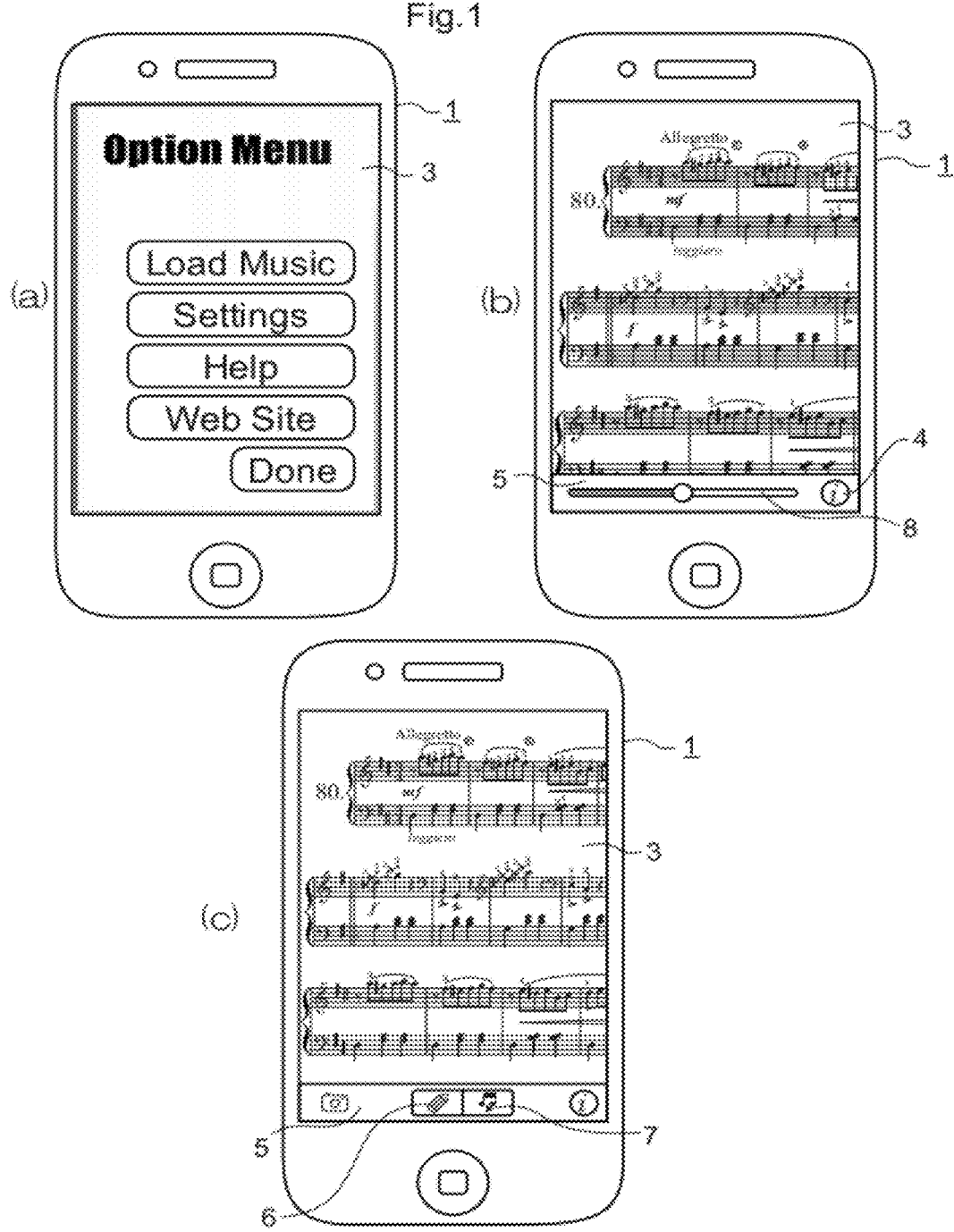
FIG. 1 shows screens of a display unit of a mobile terminal in a case where a sound reproduction program according to an embodiment of the present invention is stored in the mobile terminal to arrange a sound reproduction device, with FIG. 1A showing a menu screen, FIG. 1B showing an image pickup screen, and FIG. 1C showing a playing screen.

The sound reproduction device according to the present invention is constructed in a smartphone or other mobile terminal 1 such as shown in FIG. 1. The mobile terminal 1 includes a CPU, a storage unit, such as a ROM, RAM, or hard disk, etc., an LCD or other display unit 3, an input unit set as a touch panel inside the display unit 3, and a sound source and a speaker unit for reproducing musical sounds. A sound reproduction program is stored in advance in the storage unit of the mobile terminal 1, for example, via the internet and the mobile terminal 1 is thereby made to function as the sound reproduction device.

The sound reproduction device is arranged to be switchable among respective modes of an image pickup mode of reading a musical score image, a play mode of playing the musical score image, and an edit mode of editing the musical score image.

In the present embodiment, the display unit 3 transitions to an image pickup mode screen shown in FIG. 1B immediately after startup of the program. Also, an option menu screen shown in FIG. 1A is called by an option menu icon 4 at a lower right portion of FIG. 1B. Further, when an interior of a region besides a toolbar at a lower portion of FIG. 1B is touched, musical symbol information is detected immediately and transition to a play mode screen shown in FIG. 1C is performed. Switching to the edit mode is performed by a pencil icon 6 in the toolbar 5 at the lower portion of FIG. 1C, and switching to the play mode is performed by a note playing icon 7.

A procedure for performing sound reproduction using the sound reproduction device shall be described later.

Figure 2:
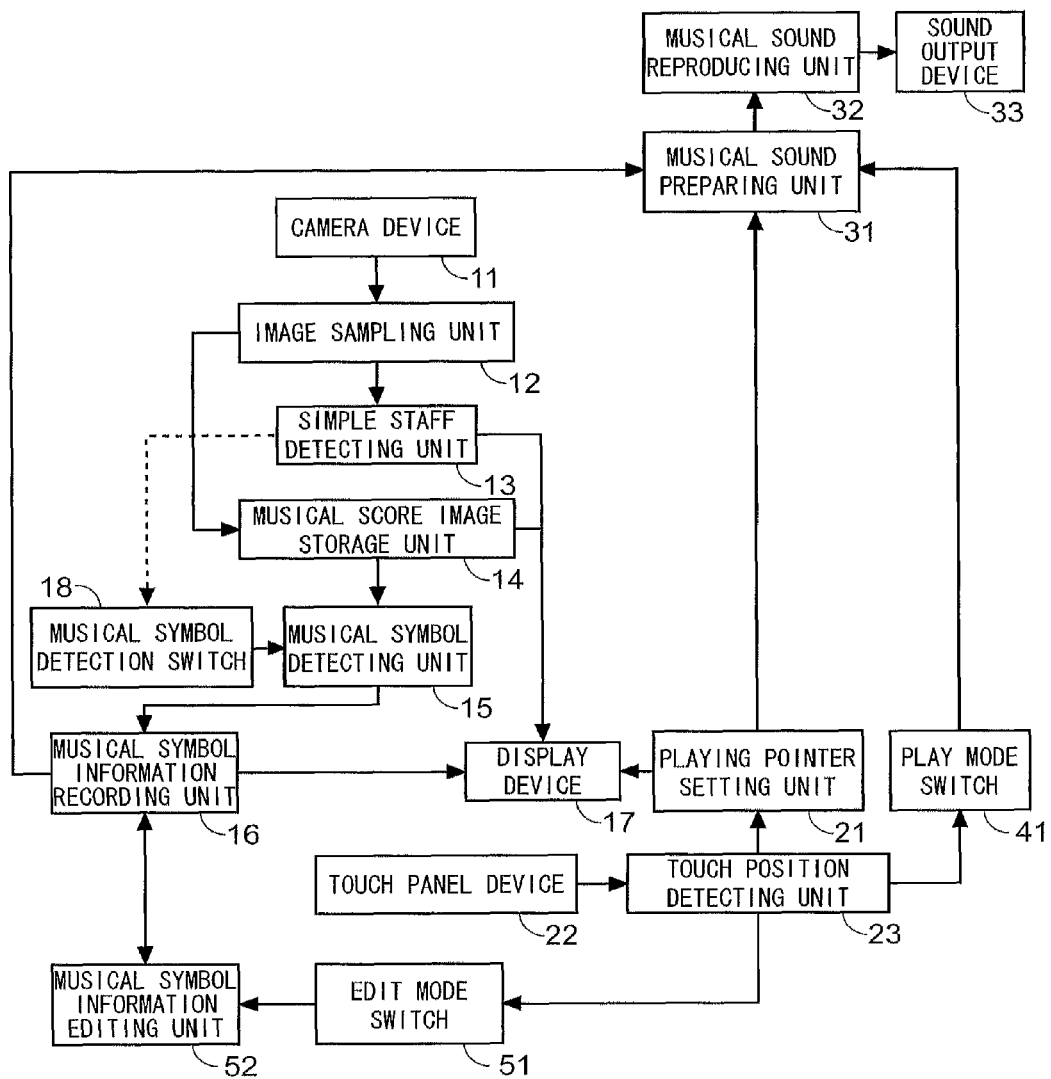
FIG. 2 is a block diagram of an arrangement of the sound reproduction device according to the embodiment of the present invention.

As shown in FIG. 2, the sound reproduction device includes a camera device 11 as an image pickup means, an image sampling unit 12 that records image pickup data, a simple staff detecting unit 13 detecting a staff from the image pickup data, a musical score image storage unit 14 that records the image pickup data, a musical symbol detecting unit 15 detecting musical symbols from the image pickup data, a musical symbol information recording unit 16 that records the musical symbols of the image pickup data, a display device (musical score display means) 17 that displays a sampling image, the simply detected staff, musical information, etc., and a musical symbol detection switch 18.

The camera device 11 is built into the mobile terminal 1 and performs image pickup of a musical score image depicted on a musical score manuscript and, for example, a device with a definition of approximately 300 thousand pixels is used. As the definition value, that which is lower by orders of magnitude in comparison to a definition (of approximately 10 million pixels) of a musical score image read by an image scanner in a known musical score recognition device is used.

The image sampling unit 12 performs image pickup of the musical score image as a sampling image at every predetermined time. The most recent sampling image data are output and rewritten successively into the musical score image storage unit 14 and subject to a simple staff detection process using a binarized image resulting from automatic binarization to white pixel data and black pixel data across a threshold value set in advance in the simple staff detecting unit 13. By performing binarization, the staff detection is facilitated and in addition, by display in association with the sampling image, qualities of image pickup conditions can be ascertained more readily.

The simple staff detecting unit 13 may include a threshold setting means enabling the threshold for automatic binarization to be set in an adjustable manner. The threshold value is made adjustable, for example, by being changeable by a user adjusting a right/left position of a threshold adjusting bar 8 displayed at a lower side of the display unit 3 of the mobile terminal 1 in the image pickup screen of FIG. 1B. The threshold adjusting bar 8 is displayed inside the toolbar 5 at the lower side of the display unit 3 only in the image pickup screen mode in which the sampling image is captured.

By the threshold setting means for adjustably setting the threshold for automatic binarization being provided, sensitivity adjustment in accordance with the imaging environment can be performed manually by the user him/herself in reading the musical score manuscript to thereby enable improvement of reading precision of the musical score image.

At the simple staff detecting unit 13, a staff in the musical score is detected in a simple manner from the sampling image. A known method that has been put into practice since priorly may be employed for staff detection. For example, as described in Japanese Published Unexamined Patent Application No. 2003-242438, a rectangle presumed to contain a staff is detected based on a cumulative histogram determined by summing a number of black pixels in a horizontal direction in the input musical score image, and the staff is detected from the musical score image data inside the rectangle. The simple staff detection is a detection method for minimizing a processing time required for staff detection as much as possible and is not restricted to the above method and may be a simple method capable of detecting the staff roughly even if the detection precision is somewhat poor. For example, a staff region may be detected just from a cyclic property of white pixels and black pixels in a vertical direction.

The musical symbol detecting unit 15 detects the staff, bar lines, notes, clefs, key signatures, accidental notations, and other musical symbols from the sampling image recorded in the musical score image storage unit 14 by a method practiced in known musical score recognition devices. As the staff information, staff position coordinates in the sampling image are detected, and as information on musical symbols besides the staff, at least X-axis (horizontal direction) and Y-axis (vertical direction) positions with respect to the staff are detected.

The musical symbol information recording unit 16 records the musical symbol information of the notes, clefs, etc., detected from the sampling image.

When the staff is detected by the simple staff detecting unit 13, the display device 17 performs a process of displaying, in the sampling image displayed on the display unit 3, the staff region in a color that differs from the color of the sampling image (for example, by displaying with just a red component of the sampling image being intensified at just that region) to perform display in a manner enabling distinguishing of the staff region and a region besides the staff region as shown in FIG. 1B. Also, the staff itself that is displayed on the display unit 3 may be displayed in a color (for example, in red lines) that differs from the color of the sampling image when the staff is detected. Further, the binarized image obtained by the binarization process performed before staff detection may be displayed overlappingly on the above image.

By such processes being performed and the staff region and the binarized image being displayed on the display unit 3, the user of the mobile terminal can readily judge that accurate musical symbol information can be read from the sampled musical score image.

The musical symbol detection switch 18 instructs, in a case where the sampling image from which the staff was detected is displayed on the display unit 3 (image pickup screen of FIG. 1B), detection of musical symbol information from the sampling image, and when the switch is put in an on (instructing) state, the musical symbol detecting unit 15 is made to detect the musical symbol information from the sampling image recorded in the musical score image storage unit 14 and the information are stored in the musical symbol information storage unit 16.

The detection instruction by the musical symbol detection switch 18 (shutter button) is issued by a user operation (for example, touching of a region other than the toolbar at the lower portion of FIG. 1B). As in the present example, it is effective to make the shutter button for detection instruction as large as possible to prevent the user from missing an opportunity to take a satisfactory image.

Also, the musical symbol detection switch 18 may include an instructing means that automatically instructs the detection of musical symbol information by the musical symbol detecting unit 15 only in a case where, when the simple staff detecting unit 13 detects a staff from the sampling image in the simple manner, the detected staff meets a predetermined detection condition.

The predetermined detection condition may be a proportion of an area of the detected staff region with respect to an area of the sampling image or a distribution trend of the detected staff region in the sampling image. In this case, the staff detection information from the simple staff detecting unit 13 is input via a signal line, indicated by a dotted line, into the musical symbol detection switch 18 that is put in the on (instructing) state automatically by the instructing means inside the musical symbol detection switch 18 if the staff is detected with the predetermined condition being met.

Alternatively, when the user operates the shutter button at a timing that the user feels to be right while checking the display unit, the instructing means inside the musical symbol detection switch 18 may, instead of turning on the detection instruction immediately, turn on the detection instruction only after the staff detection information from the simple staff detecting unit 13 meets the predetermined detection condition after the issuing of the detection instruction. By this arrangement, degradation of the imaging conditions due to a time lag between the timing that is felt right and the actual timing at which the shutter button is operated can be prevented and degradation of the detection precision due to blurring of the sampling image due to a slight movement of the camera when the shutter button is operated can also be prevented.

Also, for display of a playing pointer that indicates a playing position on the display unit 3, a playing pointer setting unit 21, a touch panel device 22, and a touch position detecting unit 23 are included. The playing pointer displayed on the display unit 3 suffices if it enables the playing position to be checked and arrangement, for example, as a finger mark, arrow, a vertical line crossing the staff, etc., may be considered.

That is, with the display device 17, the playing pointer is displayed at the position set by the playing pointer setting unit 21 with respect to the displayed musical symbol information. The entirety of the display unit 3 makes up the touch panel device 22 and when the user of the mobile terminal 1 touches the display unit 3 with a finger, the touched position is detected by the touch position detecting unit 23, the playing pointer setting unit 21 recognizes the touched position, displays the position of the playing pointer on the display unit 3, and outputs the position to a musical sound reproducing means that reproduces a musical sound based on a musical symbol information (note) corresponding to the playing pointer.

Also, when the display unit 3 is displaying the play mode screen (FIG. 1C), the touch position detecting unit 23 performs detection related to a play mode switch 41 and an edit mode switch 51 to be described later.

The musical sound reproducing means is arranged with a musical sound preparing unit 31 that prepares a sound based on a note of the musical symbol information, a musical sound reproducing unit 32 that reproduces the sound, and a speaker unit or other sound output device 33. Upon image pickup by the camera device 11 and detection of musical symbols, the data of the musical symbol information stored in the musical symbol information recording unit 16 are input into the musical sound preparing unit 31.

Also, when the play mode is selected by the play mode switch 41, the musical sound preparing unit 31 receives a signal from the touch position detecting unit 23 and prepares a sound based on the note that the playing pointer setting unit 21 designates with respect to the musical symbol information input into the musical sound preparing unit 31.

Also, the sound reproduction device includes the edit mode switch 51 and a musical symbol information editing unit 52 for editing the musical symbol information displayed on the display unit 3.

That is, when the edit mode is selected by the edit mode switch 51, modification of positions of pitches of notes (positions on the staff and accidental notations added to the notes) in the musical symbol information displayed on the display unit 3, deletion of a note in a case of erroneous recognition of the note (case where a note that is not present in the musical score image is displayed), or addition of a note in a case where the note was not recognized (case where a note in the musical score image is not displayed) is performed. The modification is performed, for example, by such methods as designating a note to be modified and moving it to a desired position, deleting the note itself, or adding a new note at any designated position. Modification information related to a movement destination, deletion, addition, etc., of a note at the musical symbol information editing unit 52 is output to the musical symbol information recording unit 16 and displayed on the display unit 3 of the display device 17 upon being rewritten to the edited musical symbol information.

A procedure by which image pickup of a musical score image of a musical score manuscript is performed and playing is performed using the sound reproduction device (mobile terminal 1) shall now be described mainly with reference to the flowchart of FIG. 3. Here, an example of reading a musical score image of an entirety or a portion of a musical score image written on a single sheet (one page) of a musical score manuscript shall be described.

When the program is started, transition to the image pickup screen (FIG. 1B) of the display unit 3 is performed.

By pointing the camera device 11 of the mobile terminal 1 toward the musical score manuscript in this state, a sampling image of an entire musical score image or a portion of the musical score image is captured (step 101).

The image sampling unit 12 stores the sampling image temporarily as a musical score image (step 102). Reading and storing of the sampling image are performed at every predetermined time, for example, three or four times a second. Also, the sampling image is rewritten and displayed continuously at every predetermined time on the display unit 3 as the sampling image before staff detection.

Next, in the simple staff detecting unit 13, binarization of the recorded sampling image across a threshold set in advance is performed and a staff is detected in a simple manner from the binarized sampling image (step 103).

The sampling image and the staff are then displayed on the display unit 3 (step 104).

Next, it is judged whether or not detection of musical symbols, such as staffs, bar lines, treble clef, bass clef, and other clefs, as well as notes, key signatures, accidental notations, etc., from the sampling image is instructed (step 105). If the detection of musical symbols is not instructed, a return to step 101 is performed and capturing of the sampling image is performed, and subsequently, this process is performed repeatedly until the detection of musical symbols is instructed. Also, at this stage, simple detection of a staff (step 103) is performed and the musical score image (sampling image) and the staff detected by simple detection are displayed on the display unit 3 (step 104). The user can thereby be notified of the imaging condition qualities in real time, and the user is enabled to instruct the detection of musical symbols at a timing that is as advantageous as possible in terms of detection precision.

If the detection of musical symbol information is instructed (step 105), the musical symbol information are detected immediately (step 106) and a transition to the playing screen of FIG. 1C is performed. In this screen, the musical symbol information, including staffs, notes, clefs, etc., are displayed on the display unit 3 (step 107). Here, the playing operations and editing operations can be facilitated by displaying the detected musical symbol information overlappingly on the sampling image.

The task of reading the musical score image is ended with the above operations.

In a case where image pickup of just a portion of the musical score image is performed, a clef and a key signature may not be included.

In such a case, the information of the clef and the key signature are needed for establishing the absolute pitch values of notes. In such a case, if a musical score image of a portion that includes the clef and the key signature has been read priorly, the musical symbols including the clef and the key signature may be detected by the musical symbol detecting unit 15 and stored in the musical symbol information recording unit 16 and the information of the already-read clef and key signature may be reflected in the later process of reading a portion of the musical score manuscript. Alternatively, a means by which the user is made to set the clef and the key signature may be provided on the screen.

A playing process regarding the read musical score image shall now be described.

When in the playing screen (FIG. 1C) on the display unit 3, a staff portion to be played is touched by a user's finger, a position in the stored musical symbol information is detected as the touch position (step 108).

The playing pointer, which is renewed in position in accordance with the touch position, is displayed on the display unit 3 (step 109). Whether or not a note for which a sound is to be emitted is present at the playing pointer position is judged (step 110) and if a note is not present, the touch position detection of step 108 is repeated and the playing pointer position renewal and display are performed (step 109). The judgment of whether or not a note for which a sound is to be emitted is present at the playing pointer position is made, for example, by judging whether or not a note in a staff corresponding to the touch position is present between an X position before renewal of the playing pointer and an X position after renewal.

When the above process is performed repeatedly and a note for which a sound is to be emitted is present at the position of the playing pointer (step 110), a musical sound is generated (step 111), musical sound reproduction is performed based on the musical sound (step 112), and this process is performed repeatedly until an end of musical score playing is selected (step 113). In a case where a plurality of notes for which sounds are to be emitted are present at the same position of a staff, musical sound reproduction of the notes as a chord is performed.

By sounds of notes being thus emitted, when the user slides a finger continuously along a staff to be played, a melody of the musical score can be reproduced in accordance with the sliding. For example, the musical score can be played in reverse by sliding the finger along the staff from right to left, and improvisational playing can be enjoyed by sliding the finger repeatedly at a specific location.

The above process is truly convenient for a learner of a chorus or musical instrument who is not good at reading musical scores because just notes of a specific portion can be sounded any number of times to check the pitches of the notes before singing or playing the instrument.

Although in the present example, the staff portion to be played is continuously touched by the user's finger to reproduce the melody in the musical score in accordance with the touching speed, arrangements may be made so that if the musical score image has been read and the musical symbol information have been displayed (step 107), the sounds of all of the notes of the read musical symbol information are emitted to reproduce the melody automatically upon, for example, selection of a reproduction button (musical reproduction start) displayed in the display unit 3 of the mobile terminal 1. In this process, preferably, lengths of notes (half notes, quarter notes, eighth notes, etc.), and types of rests are detected as the musical symbol information for accurate reproduction of the melody indicated on the musical score. The lengths of notes and rests can be judged from the image data (types of notes) in the case of detecting the notes.

By the sound reproduction device described above, if, when the user takes a image of the musical score manuscript, a staff is detected in the sampling image of the musical score image read by the image pickup unit (step 107), the imaging condition qualities during imaging can be ascertained in real time by the display of a staff region or the staff itself in a distinguishable manner.

By capturing a sampling image of satisfactory imaging conditions automatically or by a switch operation in accordance with the user's judgment, the musical score image can be read as accurate musical symbol information and the precision of musical score recognition can thus be improved in a case of using a camera device (image pickup unit) of comparatively low definition.

By reproducing musical sounds from the musical symbol information read from the musical score image by the camera device 11 built into the mobile terminal 1, melodies, musical intervals, and chords indicated in the musical score can be easily checked immediately by a simple operation.

The invention claimed is:

1. A sound reproduction method for a terminal that includes an image pickup unit and a display, the method comprising:
    capturing a musical score image as a sampling image by the image pickup unit;
    detecting a staff and a staff region from the sampling image, by a staff detecting unit;
    displaying the sampling image and the detected staff in an associated manner on the display;
    comparing the detected staff with a predetermined distribution trend of the detected staff region in the sampling image;
    detecting the musical symbol information from the sampling image, if the detected staff matches the predetermined distribution trend of the detected staff region in the sampling image;
    repeating said capturing, said detecting a staff and a staff region; said displaying and said comparing, if the detected staff does not match the predetermined distribution trend of the detected staff region in the sampling image; and
    generating a sound based on the detected musical symbol information by a sound reproducing unit.

2. The sound reproduction method according to claim 1, wherein the detection of the staff is performed from a binarized image resulting from automatic binarization of the sampling image across a threshold set in advance, and the sampling image and the binarized image are displayed in an associated manner on the display unit.

3. The sound reproduction method according to claim 1, wherein the detected staff in the sampling image is displayed in a distinguishable manner.

4. The sound reproduction method according to claim 1, wherein a detected staff region in the sampling image and a region besides the staff region are displayed in a distinguishable manner.

5. The sound reproduction method according to claim 1, further comprising displaying the detected the musical symbol information on the display.

6. The sound reproduction method according to claim 5, further comprising editing the displayed detected musical symbol information, and generating said sound based on the edited detected musical symbol information.

7. A sound reproduction device comprising:
    a camera for capturing a musical score image;
    a sampling image recording unit for recording the musical score image as a sampling image;
    a staff detecting unit for detecting a staff and a staff region from the sampling image;
    a musical symbol detection switch for comparing the detected staff with a predetermined distribution trend of the detected staff region in the sampling image, instructing detection of a staff, note, clef, and other musical symbol information from the sampling image from which the staff was detected, when the detected staff matches the predetermined distribution trend of the detected staff region in the sampling image, and instructing the camera, the sampling image recording unit, and the staff detecting unit to repeat said capturing, said recording and said detecting a staff and a staff region, and repeating said comparing, when the detected staff does not match the predetermined distribution trend of the detected staff region in the sampling image;
    a musical symbol detecting unit for detecting the musical symbol information from the sampling image according to said instructing the detection;
    a musical score display unit for displaying the musical symbol information; and
    a musical sound reproducing unit for reproducing a musical sound based on the musical symbol information displayed by the musical score display means.

8. The sound reproduction device according to claim 7, wherein the staff detecting unit is configured to perform staff detection from a binarized image resulting from binarization of the sampling image, and to display the sampling image and the binarized image in an associated manner on the display unit.

9. The sound reproduction device according to claim 8, further comprising a threshold setting unit for adjusting and setting a threshold for binarization, when the sampling image is binarized.

* * * * *